US008543768B2

(12) United States Patent
Gebara et al.

(10) Patent No.: US 8,543,768 B2
(45) Date of Patent: Sep. 24, 2013

(54) MEMORY SYSTEM INCLUDING A SPIRAL CACHE (75) Inventors: Fadi H. Gebara, Austin, TX (US);
Jeremy D. Schaub, Austin, TX (US);
Volker Strumpen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 12/640,360

(22) Filed: Dec. 17, 2009

(65) Prior Publication Data

US 2010/0122033 A1  May 13, 2010

Related U.S. Application Data (63) Continuation-in-part of application No. 12/270,095, filed on Nov. 13, 2008, now Pat. No. 8,060,699, and a continuation-in-part of application No. 12/270,249, filed on Nov. 13, 2008, now Pat. No. 8,271,728.

(51) Int. Cl.
*G06F 12/08* (2006.01)
(52) U.S. Cl.
USPC ............................ 711/140; 711/122; 711/150
(58) Field of Classification Search
None
See application file for complete search history.

(56) References Cited

U.S. PATENT DOCUMENTS

| | | | |
|---|---|---|---|
| 5,355,345 A | 10/1994 | Dickinson et al. |
| 6,763,426 B1 | 7/2004 | James et al. |
| 6,839,809 B1 | 1/2005 | Forster et al. |
| 6,996,117 B2 | 2/2006 | Lee et al. |
| 7,107,399 B2 | 9/2006 | Bilardi et al. |
| 7,461,210 B1 | 12/2008 | Wentzlaff et al. |
| 7,805,575 B1 | 9/2010 | Agarwal et al. |
| 2002/0083266 A1 | 6/2002 | Reuter |
| 2002/0116579 A1 | 8/2002 | Goodhue et al. |
| 2002/0188781 A1 | 12/2002 | Schoch et al. |
| 2003/0074505 A1 | 4/2003 | Andreas et al. |
| 2003/0128702 A1 | 7/2003 | Satoh et al. |
| 2003/0145239 A1 | 7/2003 | Kever et al. |
| 2003/0236961 A1 | 12/2003 | Qiu et al. |
| 2004/0148482 A1 | 7/2004 | Grundy et al. |
| 2005/0114618 A1 | 5/2005 | Lu et al. |

(Continued)

OTHER PUBLICATIONS

Definition of "systole"; Retrieved from http://www.merriam-webster.com/dictionary/systolic on May 10, 2012.

(Continued)

*Primary Examiner* — Gary Portka
(74) *Attorney, Agent, or Firm* — Mitch Harris, Atty at Law, LLC; Andrew M. Harris; Eustus D. Nelson (57) ABSTRACT

An integrated memory system with a spiral cache responds to requests for values at a first external interface coupled to a particular storage location in the cache in a time period determined by the proximity of the requested values to the particular storage location. The cache supports multiple outstanding in-flight requests directed to the same address using an issue table that tracks multiple outstanding requests and control logic that applies the multiple requests to the same address in the order received by the cache memory. The cache also includes a backing store request table that tracks push-back write operations issued from the cache memory when the cache memory is full and a new value is provided from the external interface, and the control logic to prevent multiple copies of the same value from being loaded into the cache or a copy being loaded before a pending push-back has been completed.

16 Claims, 6 Drawing Sheets

(56) References Cited

U.S. PATENT DOCUMENTS

| | | |
|---|---|---|
| 2005/0125702 A1 | 6/2005 | Huang et al. |
| 2005/0132140 A1 | 6/2005 | Burger et al. |
| 2005/0160132 A1* | 7/2005 | Van Doren et al. ............ 709/200 |
| 2006/0143384 A1 | 6/2006 | Hughes et al. |
| 2006/0212654 A1 | 9/2006 | Balakrishnan |
| 2007/0022309 A1 | 1/2007 | Adamo et al. |
| 2009/0178052 A1* | 7/2009 | Shen et al. ..................... 718/105 |
| 2010/0057948 A1 | 3/2010 | Hemmi et al. |
| 2010/0064108 A1 | 3/2010 | Harris et al. |

OTHER PUBLICATIONS

Office Action in U.S. Appl. No. 12/270,132 mailed on May 23, 2012.
Office Action in U.S. Appl. No. 13/419,143 mailed on Jun. 21, 2012.
Office Action in U.S. Appl. No. 12/640,451 mailed on Jul. 24, 2012.
U.S. Appl. No. 12/270,095, filed Nov. 13, 2008, Strumpen, et al.
U.S. Appl. No. 12/270,132, filed Nov. 13, 2008, Strumpen, et al.
U.S. Appl. No. 12/270,186, filed Nov. 13, 2008, Strumpen, et al.
U.S. Appl. No. 12/270,249, filed Nov. 13, 2008, Strumpen, et al.
U.S. Appl. No. 12/264,682, filed Nov. 4, 2008, Li et al.
Bilardi et al., "Optimal Organizations for Pipelined Hierarchical Memories", SPAA '02, Aug. 2002, p. 109-116, Winnipeg, Manitoba, Canada.
Kwon et al., "A Scalable Memory System Design", $10^{th}$ International Conference on VLSI Design, Jan. 1997, p. 257-260.
Kim et al., "An Adaptive, Non-Uniform Cache Structure for Wire-Delay Dominated On-Chip Caches", ASPLOS X, Oct. 2002, p. 211-222, San Jose, CA.
Baer et al., "On the Inclusion Properties for Multi-Level Cache Hierarchies", IEEE, Feb. 1988, p. 73-80.
Dickinson et al., "A Systolic Architecture for High Speed Pipelined Memories", IEEE, 1993, p. 406-409.
Beckmann et al., "Managing Wire Delay in Large Chip-Multiprocessor Caches", 37th Annual IEEE/ACM International Symposium on Microarchitecture, Dec. 2004, p. 319-330, Portland, OR.
Chishti et al., "Distance Associativity for High-Performance Energy-Efficient Non-Uniform Cache Architectures", 36th Annual IEEE/ACM International Symposium on Microarchitecture, Dec. 2003, 55-66, San Diego, CA.
Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.
Foglia et al, "A NUCA Model for Embedded Systems Cache Design", 3rd IEEE Workshop on Embedded Systems for Real-Time Multimedia, Sep. 2005, p. 41-46, New York, NY.
Huh et al., "A NUCA Substrate for Flexible CMP Cache Sharing", International Conference on Supercomputing, Jun. 2005, p. 31-40, Boston, MA.
Abella et al., "Power Efficient Data Cache Designs", IEEE Computer Society, Oct. 2003, p. 3-8, San Jose, CA.
Gilbert et al., "Variable-Based Multi-Modual Data Caches for Clustered VLIW Processors", IEEE Computer Society, Sep. 2005, p. 3-13, St. Louis, MO.
Gonzales et al., "A Data Cache with Multiple Caching Strategies Tuned to Different Types of Locality", ACM, 1995, p. 338-347.
Lee et al., "Region-Based Caching: An Energy Delay Efficient Memory Architecture for Embedded Processors", CASES, 2000, p. 120-127.
Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.
Matteo Frigo. The Weakest Reasonable Memory Model. Master's thesis, Department of Electrical Engineering and Computer Science, Massachsetts Institute of Technology, 1998.
Blumofe, et al., "Dag-Consistent Distributed Shared Memory", Proceedings of the 10th International Parallel Processing Symposium (IPPS), pp. 132-141, Honolulu, Hawaii, 1996.
Akioka, et al., "Ring data location prediction scheme for Non-Uniform Cache Architectures," *International Conference on Computer Design*, Piscataway 2008.
Jin, et al., "A Domain-Specific On-Chip Network Design for Large Scale Cache Systems," *13th International Symposium on High-Performance Computer Architecture (HPCA-13)*, Phoenix, 2007.
Office Action in U.S. Appl. No. 12/640,348, mailed Aug. 29, 2012.
Definition of "systole"; Retrieved from http://www.merriam-webster.com/dictionary/systolic on Aug. 23, 2012.
Molnar, et al., "Counterflow Pipeline Processor Architecture", Technical report, SMLI TR-94-25, Sun Microsystems Laboratories, Inc., Apr. 1994.
Final Office Action in U.S. Appl. No. 12/640,348, mailed on Feb. 12, 2013.
Final Office Action in U.S. Appl. No. 12/640,451, mailed on Feb. 13, 2013.
Final Office Action in U.S. Appl. No. 12/270,132, mailed on Nov. 28, 2012.

\* cited by examiner

MEMORY SYSTEM INCLUDING A SPIRAL CACHE

The present Application is a Continuation-in-Part of U.S. patent application Ser. No. 12/270,095 entitled "A SPIRAL CACHE MEMORY AND METHOD OF OPERATING A SPIRAL CACHE", and Ser. No. 12/270,249 entitled "SPIRAL CACHE POWER MANAGEMENT, ADAPTIVE SIZING AND INTERFACE OPERATIONS", both of which were filed on Nov. 13, 2008, have at least one common inventor, and are assigned to the same Assignee. The disclosures of the above-referenced U.S. patent applications are incorporated herein by reference.

BACKGROUND OF THE INVENTION

1. Field of the Invention

The present invention is related to hierarchical memory systems, and more particularly to a memory interface that couples a spiral cache memory to other members of a memory hierarchy.

2. Description of Related Art

A spiral cache memory as described in the above-referenced Parent U.S. Patent application supports multiple in-flight requests referencing the same or different values by their address. In order to integrate a spiral cache memory in a hierarchical memory system, while permitting the next lower-order level of the memory hierarchy or a processor to access the same value repeatedly before a request for the same value is completed, a way to ensure that writes to the value are satisfied before subsequent reads is needed. It is desirable to do so without constraining the activity of the processor or lower-order level of the memory hierarchy that is coupled to the front-most storage tile, as to do so would introduce performance penalties, or require the processor architecture and/or program code to constrain the order of accesses. Also, in particular because the backing store will generally have a much higher latency that the spiral cache itself, queues as described in the above-incorporated parent U.S. patent application are needed between the memory hierarchy levels, and in order to not constrain the activity of the spiral cache with respect to the backing store, at least at the internal level of the storage tiles, it is desirable to provide a mechanism to coordinate requests to the backing store so that push-back write values can be coordinated with read requests issued to the backing store. Further, read requests issued to the backing store return values from the backing store into the spiral cache. Without checking the address of each value and tracking all of the values present in the spiral cache, multiple copies of the same value could be read into the spiral cache. Therefore, a mechanism to prevent multiple copies of the same value being returned to the spiral cache is needed.

Therefore, it would be desirable to provide a spiral cache interface to a memory hierarchy and an integrated memory hierarchy including a spiral cache, in which multiple outstanding requests for the same value can be issued into the spiral cache without constraining the processor, program code, or lower-order level of the memory hierarchy. It would further be desirable to provide an interface from the spiral cache to a backing store without constraining the behavior of the network of tiles in the spiral cache or having multiple copies of the same value returned to the spiral cache.

BRIEF SUMMARY OF THE INVENTION

The invention is embodied in a spiral cache memory, a hierarchical memory system including the spiral cache memory and methods of operation of the system. The spiral cache memory has multiple tiles with storage locations for storing values, each of which may be a smaller cache memory such as a direct-mapped cache or an associative cache.

Multiple requests accessing the same value can be issued into the spiral cache and to prevent erroneous reads due to the requests directed to the same value not being satisfied in the order in which they are issued into the spiral cache, but the order in which the requests are returned, an issue table is used to track the requests and control logic within the spiral cache memory interface controls the order of application of the returned requests to the interface that couples the spiral cache to the lower-order level of the memory hierarchy or processor.

Prevention of multiple copies of the same value from being returned to the spiral cache from the backing store is performed by maintaining a backing store request table that prevents multiple read requests to the same value (address) being issued to the backing store. The backing store request table also tracks push-back write operations issued from the spiral cache by giving priority to write operations coming from the push-back spiral over read requests issued from the spiral cache due to a miss.

The memory interface also provides a number of queues to buffer operations and values/requests for preventing overflow of the backing store, for ordering of operations on values and serializing requests, as are described in further detail below.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses techniques for effectively integrating a spiral cache memory into a memory hierarchy. A memory interface having a number of tables and queues provides unconstrained operation by the adjacent levels of the system hierarchy, by controlling the order of application of values returned from the spiral cache according to the order of the issued requests and not the order of the returned values, which may not match. The memory interface also ensures that the backing store input does not overflow and that multiple copies of the same value are not loaded into the spiral cache due to multiple requests issued at the front of the spiral. The memory interface also ensures that backing store read requests do not bypass push-back values that are propagating backwards through the spiral, returning invalid values that are not identified as such. An arrangement of a spiral cache that locates the lower-order and higher-order hierarchy member interfaces at edges of the spiral is also further illustrated, and while the cache type is still referred to as "spiral", since the front-most tile is not located near the center of the array, the push-back network follows a meandering path that zig-zags in segments of increasing length.

Black-Box Behavior of the Spiral Cache

Figure 1:
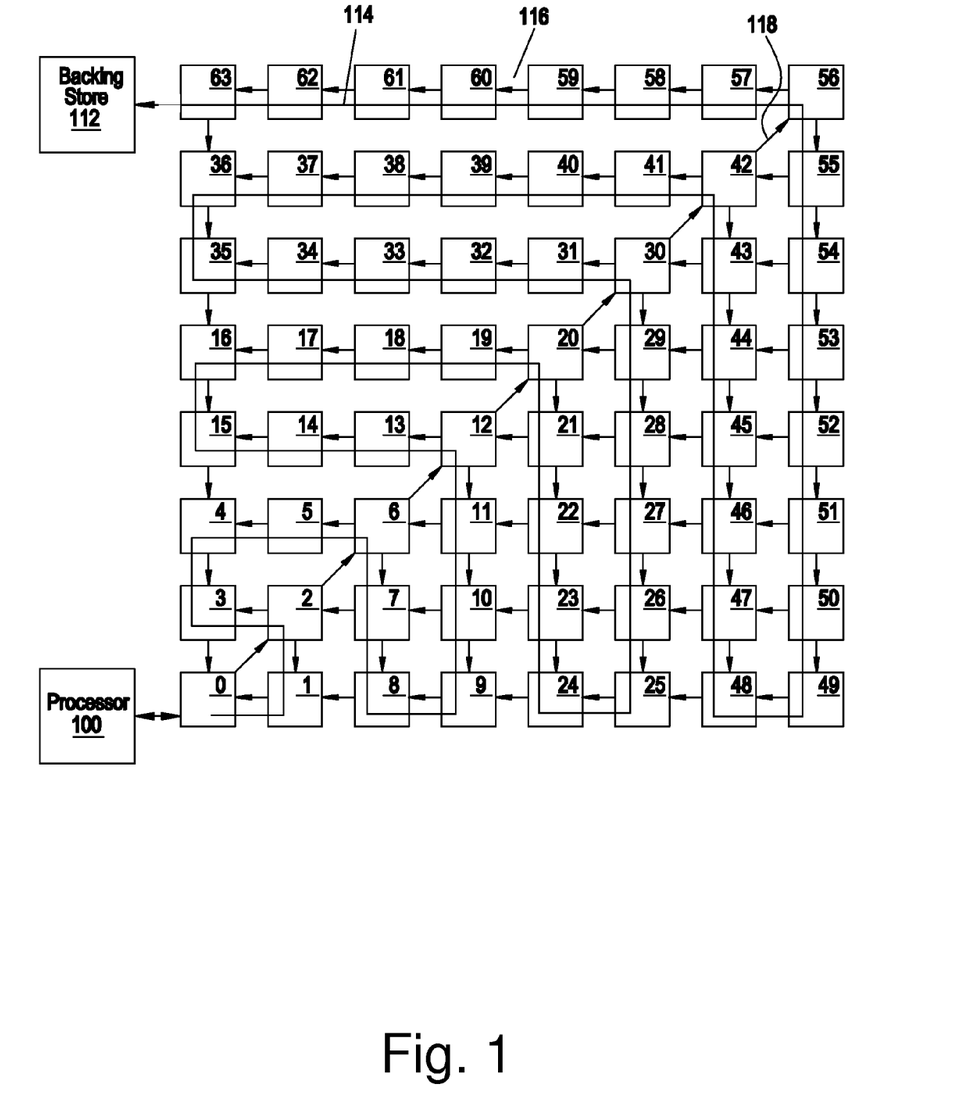
FIG. 1 is a block diagram of a system incorporating a spiral cache according to an embodiment of the present invention.

Referring now to FIG. 1, a hierarchical system including a spiral cache is illustrated. The illustrated spiral cache is composed of tiles 0-63 and resembles a single quadrant of the spiral caches disclosed in the above-incorporated parent U.S. patent application "SPIRAL CACHE POWER MANAGEMENT, ADAPTIVE SIZING AND INTERFACE OPERATIONS", and is a larger version of the cache depicted in FIG. 8A of the above-incorporated parent U.S. patent application "A SPIRAL CACHE MEMORY AND METHOD OF OPERATING A SPIRAL CACHE." The illustrated spiral cache includes two systolic networks, a push-back (spiral) network 114 and a move-to-front network 116. Push-back network 114 imposes a linear structure on the tiles and is coupled at front-most tile 0 to a processor 100 and at a back-most tile 63 to a backing store 112. Each of tiles 0-63 contains a fast cache memory, such as a direct-mapped cache, and the unit of data transfer across the networks in such a configuration is a cache line. The move-to-front heuristic places cache lines into tiles. A processor issues load or store operations to front-most tile 0. Independent of the particular operation being performed on a value, the spiral cache fetches the corresponding cache line and places it in front-most tile 0. For load operations, the desired data are also sent to processor 100. For store operations, the cache line is patched with the store data before writing the cache line into the cache of tile 0. If the corresponding cache line storage of tile 0 is occupied, the line currently stored in the corresponding location is pushed back to empty the cache ling storage to accept the new line. The push-back operation effectively swaps values (e.g., cache lines) back at each tile along push-back network 114. Data being pushed back travel along push-back network 114 from front-most tile 0 towards the tail end of the spiral, until an empty line is located, or until the data is pushed out of the spiral cache into backing store 114.

Figure 2:
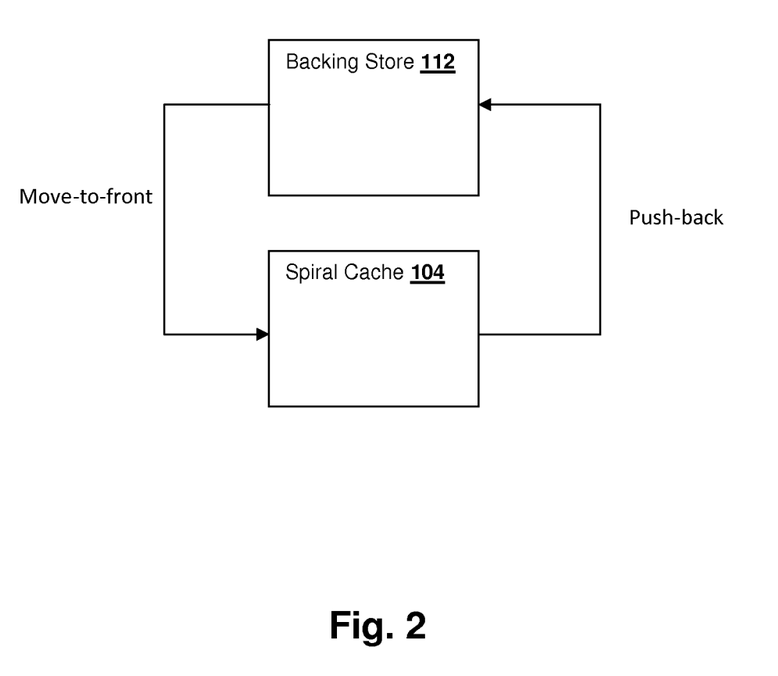
FIG. 2 is illustrates the relationship between the spiral cache and the backing store in FIG. 1.

The cache line being accessed by a load or store operation may be located within the spiral cache, or the cache line may be absent. If the cache line is present, the spiral cache can report a hit, which completes the associated operation successfully. Otherwise, if the accessed cache line is not present in the spiral cache, we incur a miss. A miss requires fetching the cache line from backing store 112 and moving the cache line to front-most tile 0. The move-to-front (M2F) operation involves not only the move-to-front network 114 inside the spiral cache, but requires an additional connection to backing store 112. Referring now to FIG. 2, a simplified block diagram illustrates the relationship between spiral cache 104 and backing store 112. If a request hits in spiral cache 104, no communication occurs outside the spiral cache, with the exception of sending the requested load value to processor 100. When a hit occurs, the search for the requested item succeeds inside the spiral cache. The associated cache line is moved to front-most tile 0, leaving an empty (invalid) cache line behind. In the worst case, a push-back operation initiated in front-most tile 0 to make space for the moved cache line generates swap operations that propagate all the way to the tile where the cache line was found. If there is an invalid cache line in a tile closer to the front of the spiral, then the push-back operation terminates at that tile. If a request misses in the spiral cache, the requested cache line is moved from the backing store into front-most tile 0. When a miss occurs, the associated push-back operation may cause a cache line to be pushed back into backing store 112, since a new cache line is being brought into spiral cache 104 and all of the corresponding cache line storage in tiles 0-63 may already contain valid entries.

When spiral cache 104 reports a miss, a single-copy invariant condition imposed on spiral cache 104 guarantees that the requested cache line does not exist anywhere in spiral cache 104. Therefore, the cache line is fetched from backing store 112, and written into front-most tile 0. The associated push-back operation causes a cache line to be written into backing store 112 if all tile caches contain non-empty (valid) cache lines. The black-box communication behavior of spiral cache 104 is described below. Data are communicated between spiral cache 104 and backing store 112 only in case of a miss. A miss requires a cache line to be moved from backing store 112 into front-most tile 0. The associated push-back operation may cause a cache line to be written into backing store 112. It is noted that cache lines are initially loaded into spiral cache 104 only at front-most tile 0, and leave spiral cache 104 only from the tail end of spiral cache 104. A pushed-back cache line exits a spiral cache of N tiles at the tail end after a delay of at least N−1 duty cycles has elapsed since the writing of the cache line fetched from backing store 112 into front-most tile 0. In order for the above-described black-box behavior of the spiral cache to operate, the ordering of requests and responses must be considered. Spiral cache 104 does not inherently preserve any ordering. Multiple requests to different cache lines may return in arbitrary order depending on the location of the values being requested. Requests to the same cache line may also return in a different order, depending on the location of the cache line, the operation of the geometric retry mechanism, and the collision resolution mechanism of new requests on the diagonal in the move-to-front network, as described in the above-incorporated parent U.S. Patent Application"A SPIRAL CACHE MEMORY AND METHOD OF OPERATING A SPIRAL CACHE." Therefore, any ordering guarantees of the responses with respect their requests must be implemented outside of the spiral cache tile array. The present invention provides mechanisms to guarantee the completion order of load and store operations to the same cache line as issued by processor 100, without imposing any ordering restrictions on operations to different cache lines. The ordering behavior described above is consistent with that of contemporary processor architectures, which are capable of accepting multiple outstanding memory operations.

System Integration of a Spiral Cache

Figure 3:
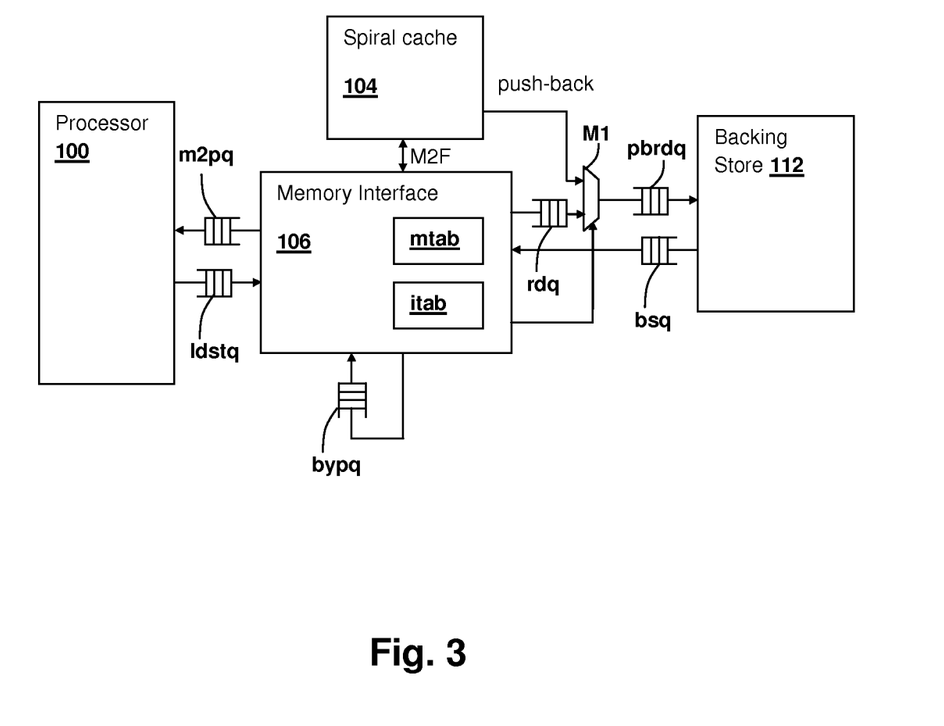
FIG. 3 is a block diagram illustrating further details of a spiral cache integrated within a memory hierarchy in accordance with an embodiment of the present invention.

Referring now to FIG. 3, a block diagram of a hierarchical system including a spiral cache 104 is shown in accordance with an embodiment of the present invention. The system includes a number of queues that interconnect processor 100 and backing store 112 with spiral cache 104. The system of FIG. 3 also includes a memory interface 106 that manages the above-described operations occurring at front-most tile 0 and back-most tile 63 in spiral cache 104, in order to meet the ordering requirements for processor 100 and preserve the single-copy invariant condition within spiral cache 104. With the exception of the push-back output of the spiral cache, memory interface 106 controls all dataflow between processor 100, backing store 112, spiral cache 104 and the various queues. The processor is de-coupled from the memory system by means of two queues, a load-store queue ldstq and a memory-to-processor queue m2pq. The same de-coupling interface can be employed if spiral cache 104 implements a higher-order level of the memory hierarchy, in which case the next lower-ordered cache would be connected in place of processor 100. However, when integrating spiral cache 104 with contemporary processors, the processors already include some of the functionality of memory interface 106 to track ordering of memory operations. Therefore, portions of memory interface 106 and load-store queue ldstq, memory-to-processor queue m2pq, and bypass queue bypq could be integrated into processor 100. In the following description, it is assumes that other than in load-store queue ldstq and memory-to-processor queue m2pq, the unit of data transfer within spiral cache 104, as well as across all queues is a cache line.

Queues and Tables

The various queues and tables included in the system of FIG. 3 are summarized below and are implemented in hardware. The processor issues load and store requests to memory by enqueuing them into load-store queue ldstq. The memory system returns load values and potentially store acknowledgements to the processor via the memory-to-processor queue m2pq. When the spiral cache misses, memory interface 106 sends a read request to backing store 112 by enqueuing it into a read queue rdq. Two types of requests may be sent from spiral cache 104 to backing store 112, read requests as mentioned above and write requests originating from the tail end of the push-back network. A push-back/read queue pbrdq serializes these two types of requests and presents them to backing store 112. As will be explained in further detail below, read requests enqueued in read queue rdq are immediately passed through to push-back/read queue pbrdq, unless a backing store write request (due to a push-back leaving the tail end of spiral cache 104) is being enqued at the same time, causing a conflict. If a conflict exists, multiplexer M1 "favors" enqueing a backing-store write request into push-back/read queue pbrdq and read requests are pended in read queue rdq. Backing store 112 responds with cache lines retrieved in response to read requests by enqueuing them into a backing store queue bsq. A bypass queue bypq enables memory interface 106 to accept multiple outstanding read requests to the same cache line in backing store 112, without incurring the presumably high backing store access latency for each request.

In addition to the queues described above, memory interface 106 contains two tables: An issue table itab keeps track of all outstanding memory operations, and ensures that memory interface 106 performs load and store operations to the same cache line in the order issued by the processor into load-store queue ldstq. A backing store request table mtab keeps track of all outstanding backing-store read operations, and guarantees that multiple read requests directed to the same cache line result in a single read operation from backing store 112, which preserves the single-copy invariant condition. A primary function of the queueing system architecture depicted in FIG. 3 is to coordinate the dataflow between components having different access latencies and throughput, e.g., backing store 112 vs. spiral cache 104. Spiral cache 104 has variable access latency and throughput. Backing store 112 generally has much larger latency, typically about three orders of magnitude larger than the best-case access latency of spiral cache 104. Also, backing store 112 may or may not permit pipelined operation. Processor 100 may produce memory operations at a rate as high as one operation per clock cycle. The following description limits processor operations to load and store operations, and assumes that processor 100 can stall if load-store queue ldstq is full.

The dataflow of a memory operation through the memory system depicted in FIG. 3 is described below. Processor 100 enqueues a load or store request in load-store queue ldstq. Memory interface 106 dequeues the request, inserts the request into issue table itab, and issues the address into the move-to-front network of spiral cache 104. Depending on the placement of the requested cache line, it may require multiple retries before the request succeeds with a hit or the request results in a miss. If the spiral cache responds with a hit, the next action depends on the type of the operation. If the request is associated with a load operation, the value is returned to the processor by enqueuing it in the memory-to-processor queue m2pq. Otherwise, if the request is associated with a store operation, the store value is retrieved from issue table itab and patched into the cache line, before storing the value in front-most tile 0. If processor 100 requires a store acknowledgment, the store acknowledgement is enqueued into memory-to-processor queue m2pq and the value is stored in front-most tile 0. For either type of operation, the corresponding entry in issue table itab is then removed, and the request is completed. If the spiral cache 104 responds with a miss, memory interface 106 issues a read request to backing store 112. Memory interface 104 enqueues the read request into read queue rdq and inserts the address into backing store request table mtab. Backing store 112 responds with the requested cache line by enqueuing it into backing store queue bsq. Memory interface 106 dequeues the cache line from backing store queue bsq, and stores it in front-most tile 0, potentially patched with a store value that was stored in issue table itab if the operation requesting the cache line was a store operation. The entry in backing store request table mtab entry is deleted, and bypass queue bypq entries are updated, as will be described in further detail below. As when the operation hits in spiral cache 104, a reply to processor 100 is enqueued in memory-to-processor queue m2pq and the corresponding entry in issue table itab is removed, which completes the request. The above description applies to a single memory operation. System operation becomes more complex when multiple operations are in flight. Due to concurrency, three issues must be tackled to guarantee correct operation, ordering of responses, and proper flow-control: (1) ordering of responses to the same cache line that hit in spiral cache 104; (2) serialization of push-back write requests from spiral cache 104 and read requests from the memory interface 106 before the requests are sent to backing store 112; and (3) handling multiple requests to the same cache line for cache lines that miss in spiral cache 104.

Ordering of the Spiral Responses

The ordering problem of a sequence of load and store operations to the same cache line that hit in spiral cache 104 is as follows. Assume, for example, that processor 100 issues a store operation and subsequently a load operation to the same address. For correctness, it is expected that the load operation responds with the previously stored value. Problems can arise within the system, because requests may return out of order from spiral cache 104. For example, assume in a hypothetical system that a request issued into the spiral cache comprises all the information needed to service the request, including an op-code to distinguish loads from stores, the address, and the store value if it applies. It should be noted that this request differs from the requests used in the exemplary system of FIG. 3, as within spiral cache 104, requests due to load operations are not distinguished from requests due to store operations. If memory interface 106 first issues an unrelated request into spiral cache 104, then issues the store request, and finally issues the load request, the timing may be such that the unrelated request is travelling toward front-most tile 0 on the move-to-front network, and conflicts with the store request at a diagonal tile, forcing the store request outwards to enter the move-to-front network beyond its intended retry radius. In the subsequent duty cycle, the load request enters the move-to-front network at its intended retry radius, and thereby overtakes the store request. If the load request finds the cache line, it moves it to the front, and memory interface 106 delivers the current value to processor 100. The trailing store request finds the cache line in tile 0, where the store is performed only after the load, which is incorrect memory behavior. To guarantee correct ordering, issue table itab is introduced, which enables memory interface 106 to issue typeless requests into spiral cache 104. Requests issued into the spiral cache are oblivious to the type of memory operation, and serve to move the requested cache line to front-most tile 0. An entry in issue table itab includes the address of a memory operation, its type (load or store), and the store value in case of a store operation. Issue table itab is organized as a first-in-first-out (FIFO) queue with an enqueue operation that appends a new entry. To lookup or remove an entry, issue table itab can be implemented with a priority decoder that identifies the closest entry to the head that is associated with a given address.

A request issued by memory interface 106 into spiral cache 104 includes the address and a retry radius. When the corresponding response (reply) arrives on the M2F network at front-most tile 0, the address portion of the response is used to retrieve the corresponding entry from issue table itab. It is the entry in issue table itab that provides the operational context, and for store operations, the entry provides the store value. Support for multiple outstanding requests per cache line is provided by organizing issue table itab as a FIFO queue. The implicit ordering of the issue table itab FIFO maintains the order of memory operations. Therefore, when a store operation is issued before a load operation to the same address, the store operation entry precedes the load operation entry in issue table itab, and will be completed before the load operation is completed.

Figure 4:
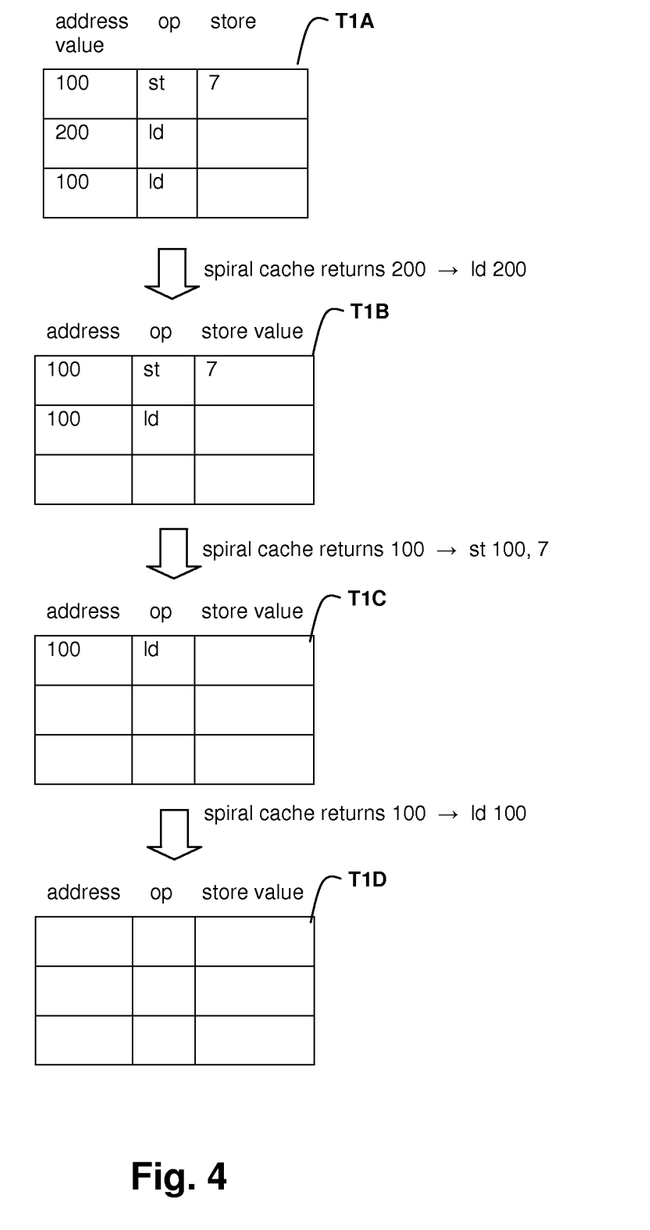
FIGS. 4-5 are processing flow diagrams illustrating sequences of operations within the system of FIG. 3.

Referring now to FIG. 4, an exemplary re-ordering operation in the system of FIG. 3 is shown. Operations are notated below in the form: ld <addr> or st <addr>, <val>. Processor 100 issues three memory operations in the order: st 100,7; ld 200 and ld 100, which are tracked in issue table itab as illustrated in table T1A. Spiral cache 104 returns the responses out of order, and the order in which the cache lines arrive at frontmost tile 0 is according to addresses 200, 100, 100, with the requests for address 100 returning out of order. However, since spiral cache 104 does not maintain the association with the requesting operations, the order in which the requests return does not determine the execution order. The execution order is determined by retrieving the first entry with a matching address from issue table itab which produces: ld 200 as shown in the transition from table T1A to table T1B, which shows issue table itab having two entries remaining Next, in response to the first response with address 100, issue table itab produces st 100,7 as illustrated by the transition from table T1B to table T1C. Finally, in response to spiral cache returning the next response with address 100, issue table produces ld 100 as shown in the transition from table T1C to table T1D, showing issue table itab as being empty. Thus, issue table itab ensures that the store to address 100 completes before the load. FIG. 4 illustrates the functionality of issue table itab. The requests traveling through storage tile network 104 are not explicitly associated with the original processor operation or corresponding entry in issue table itab. Instead, a request carries an address, such as address 100, only. Although memory interface 106 dequeues an entry from load-store queue ldstq, inserts the entry in issue table itab, and issues a request into spiral cache, the request is not associated with the particular entry in issue table itab except through a matching address. There can be as many outstanding requests for one address in spiral cache 104 as there are entries in issue table itab. When spiral cache 104 returns a response, issue table itab is searched for the first entry from the head having a matching address. In FIG. 4, the first response is due to the second request, issued when handling the load operation. Nevertheless, the first entry in issue table itab that is associated with address 100 is the store operation. Thus, issue table itab enables the spiral cache to complete memory operations affecting the same cache line in the order in which they were issued by the processor.

Serialization of Backing Store Operations

Backing store 112 serves read operations issued by memory interface 106 into read queue rdq if a request misses in spiral cache 104. Backing store 112 also serves write operations emitted by the push-back network of spiral cache 104. Since there are two distinct sources for these operations: memory interface 106 for reads; and the push-back network for writes, the operations must be serialized. Serialization of read and write requests to backing store 112 must respect the following ordering constraint: if a read operation issued by memory interface 104 to backing store 112 contains the same address as a write operation issued by the push-back network, then the write operation must precede the read operation. The reason for the ordering constraint is described below. A write operation to backing store 112 contains a modified (dirty) cache line because push-back requests containing clean cache lines are discarded at the tail end tile of spiral cache 104. (There is no reason to return a clean cache line to backing store 112, as by definition, the clean cache line is already identically present in backingstore 112.) The backing store write operation originates at the tail end of the push-back network of spiral cache 104, when tail-end tile 63 (tile N−1) pushes a dirty value out. The dirty value was produced earlier by a store operation that stored the modified value in front-most tile 0. Subsequent memory accesses cause the dirty value to be pushed back through the push-back network. An example of such memory accesses is: N accesses that missed in spiral cache 104 and have the same direct mapping as the dirty line, causing the corresponding values to be read from backing store 112 and loaded into tile 0 in the same cache line that the dirty line occupied. As each value is pushed-back to make room for the next, because their mapping is the same, they will push the previous occupants of that storage, including the dirty line, backward at each access. As another example, spiral cache 104 could have received N−1 requests, again mapped to the same cache lines, that hit in spiral cache 104, causing the corresponding values to be moved into front-most tile 0, causing the dirty line to be pushed back by N−1 tiles into tail-end tile 63. One subsequent request that maps to the same cache line, but misses in spiral cache 104, causes the corresponding value to be loaded from backing store 112 and stored in front-most tile 0, causing the dirty line to be pushed out of tail-end tile 63. If processor 100 issues a load operation for the dirty cache line while the dirty cache line is pushed back on the push-back network toward backing store 112, a race condition occurs if spiral cache 104 reports a miss, and memory interface 106 initiates a read operation to backing store 112 before the dirty line has been written back into backing store 112.

The move-to-front request of the load operation traverses spiral cache 104 while the requested cache line, modified by the preceding store operation, is pushed back on the push-back network within spiral cache 104 or has been pushed out of spiral cache at tail-end tile 63. If the cache line is in spiral cache 104, the single-copy invariant condition guarantees that the move-to-front request will move the cache line to frontmost tile 0. Otherwise, the cache line must have been pushed out of spiral cache 104 via the push-back network. In the extreme case of timing a spiral cache hit, the move-to-front request meets the requested cache line during the same duty cycle that the push-back value arrives at tail-end tile 63. For a miss to occur, the requested cache line must have been pushed out at least one duty cycle before the move-to-front request reaches tail-end tile 63. Since the M2F request must travel to memory interface 106 before a miss can be reported and a read request issued to backing store 112, the travel time of the M2F request from tail-end tile 63 to frontmost tile 0 enables ordering of backing store operations such that the write operation will reach the backing store before the read operation. To prevent a race condition between backing store write and read requests, push-back read queue pbrdq forms the master queue of read queue rdq. As such, direct insertions into push-back read queue pbrdq have priority over entries in read queue rdq. Thus, write operations emitted by the push-back network have priority over read operations originating from the M2F network, and are enqueued immediately into push-back read queue pbrdq. Read operations are enqueued into push-back read queue pbrdq when possible, that is during clock cycles when no push-back request is being enqueued. Collisions are resolved by enqueuing read operations in read queue rdq. The organization of the push-back read queue pbrdq and read queue rdq guarantees that a read request to backing store 112 trails a potential write request. Thus, backing store 112 serves the above described exemplary read operation correctly with the cache line written during the preceding push-back write operation.

Multiple Spiral Misses

When spiral cache 104 accepts multiple outstanding requests, one or more of them may miss. Backing store request table mtab and bypass queue bypq are included to prevent duplication of lines in the spiral cache when multiple misses to the same cache line require retrieving the cache line from the backing store. The potential for duplication of cache lines due to multiple outstanding backing-store read requests exists due to multiple operations to the same address. For example, assume that processor 100 issues a store followed by a load operation to the same cache line, as discussed above, and that both spiral responses result in a miss, but are returned in order. Without including logic for handling such conditions, memory interface 106 would enqueue two read requests to backing store 112, the first associated with the store operation, and the second with the load operation. Assuming that backing store 112 preserves the order of the requests, it first returns the requested cache line associated with the store operation. Memory interface 106 would then patch the cache line with the store value and write the cache line into front-most tile 0. When backing store 112 returns the same cache line again, now associated with the load operation, memory interface 106 would return the requested load value to processor 100, and write the cache line into front-most tile 0, overwriting the previously written store value. Not only is the load value returned to processor 100 different from the expected value, but all subsequent load operations will return the wrong value as well. If the first copy of the cache line returned by backing store 112 is pushed back and out of tile 0 before memory interface 106 writes the second copy into tile 0, the problem is further exacerbated. Spiral cache 104 now contains two copies of the same cache line, violating the single-copy invariant condition. Therefore, memory interface 106 prevents duplication of cache lines due to multiple outstanding read requests to the backing store. In the illustrated embodiment of FIG. 3, memory interface 106 permits at most one outstanding read request per cache line, and delays additional requests to the cache line until backing store 112 has returned the cache line. Backing store request table mtab and bypass queue bypq are used to implement this strategy.

Backing store request table mtab is an associative memory that maintains one entry per cache-line address for each outstanding backing store read request. An address entry is inserted into backing store request table mtab when the spiral cache 104 responds with a miss. Memory interface 106 also enqueues a read request with the associated address into read queue rdq. The entry is deleted from the backing store request table mtab when memory interface 106 dequeues the backing store response from backing store queue bsq, and stores the cache line in front-most tile 0 of the spiral cache. Bypass queue bypq is a FIFO queue with additional functionality resembling that of an associative memory. Each queue entry contains an address plus a ready bit. Insertion of an entry into bypass queue bypq corresponds to a conventional enqueue operation. When inserting an address, its associated ready bit is initialized to not-ready. However, dequeuing an entry from bypass queue bypq is not performed according to a conventional dequeue operation. Instead, to dequeue an entry associated with an address, a priority decoder is included, which identifies the first ready entry having the requested address from the head of the queue, as has been described above for the operation of issue table itab. Bypass queue bypq also includes circuitry that implements a "ready" operation that sets the ready bits of all entries associated with an address from not-ready to ready.

Figure 5:
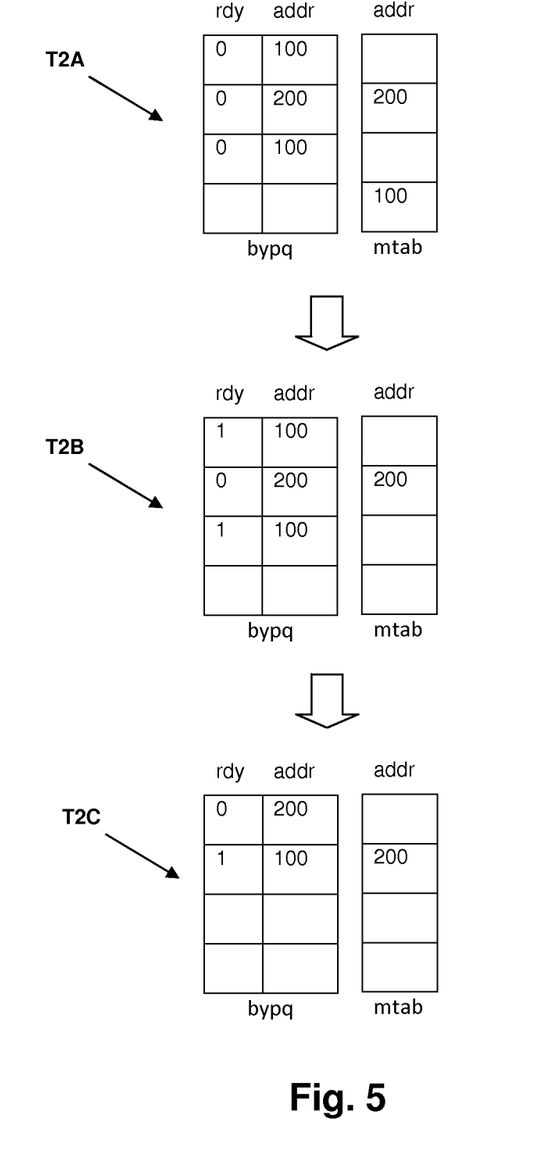

Referring now to FIG. 5, exemplary operation of backing store request table mtab and bypass queue bypq in the system of FIG. 3 are illustrated. FIG. 5 shows a sequence of operations as coordinated by memory interface 106 with support of the backing store request table mtab and bypass queue bypq. In the example, the processor issues three memory operations (load or store) to the cache line at address 100, and two operations to the cache line at address 200. Assuming that memory interface 106 dequeues all five requests from the ldstq, inserts them into the itab, and issues the associated requests into spiral cache 104. All requests miss eventually, and are returned, potentially out of order, by spiral cache 104. For example, if the first response from spiral cache 104 is a miss report for address 100, then memory interface 106 sends a read request with address 100 to backing store 112 and inserts address 100 into backing store request table mtab. Next, the second miss report for address 100 may arrive at memory interface 106. Memory interface 106 examines backing store request table mtab and determines that an entry for address 100 already exists. Therefore, memory interface 106 does not send another read request to backing store 112 but enqueues an entry in bypass queue bypq containing address 100 with the ready bit clear (not-ready). Subsequently, two miss reports for address 200 are handled in a similar manner, and finally, another miss report for address 100 causes an entry to be enqueued in bypass queue bypq. The state of backing store request table mtab and bypass queue bypq after the above-described operations is illustrated in table T2A. Assuming that backing store 112 maintains the order of the read requests it receives, the first response contains the cache line at address 100. After memory interface 106 dequeues the cache line from backing store queue bsq, the information stored in issue table itab is used to perform the associated load or store operation, and the cache line is written into front-most tile 0, as described above. The entries in issue table itab and backing store request table mtab are then deleted. Also, the ready operation of bypass queue bypq is applied to address 100, and the remaining outstanding operations associated with this address are now marked ready, as illustrated in table T2B.

Memory interface 106 is responsible for dequeuing ready entries from the bypass queue bypq in FIFO order. There are two ready entries associated with address 100 illustrated in table T2B. The first entry corresponds to the second memory operation associated with address 100. After the first entry is dequeued, the state of bypass queue bypq is as shown in table T2C. Memory interface 106 issues a request for the address of the entry dequeued from bypass queue bypq into spiral cache 104. When spiral cache 104 responds, issue table itab provides the information needed to handle the response as for any other spiral cache responses. Backing store request table mtab and bypass queue bypq not only serve to enforce correctness by preventing duplication of cache lines, but also to improve performance. If multiple requests to a particular memory address occur in close succession, backing store request table mtab and bypass queue bypq reduce the overall latency from multiple, presumably high-latency accesses to the backing store to just one. This capability also improves the throughput of the overall memory system.

Figure 6:
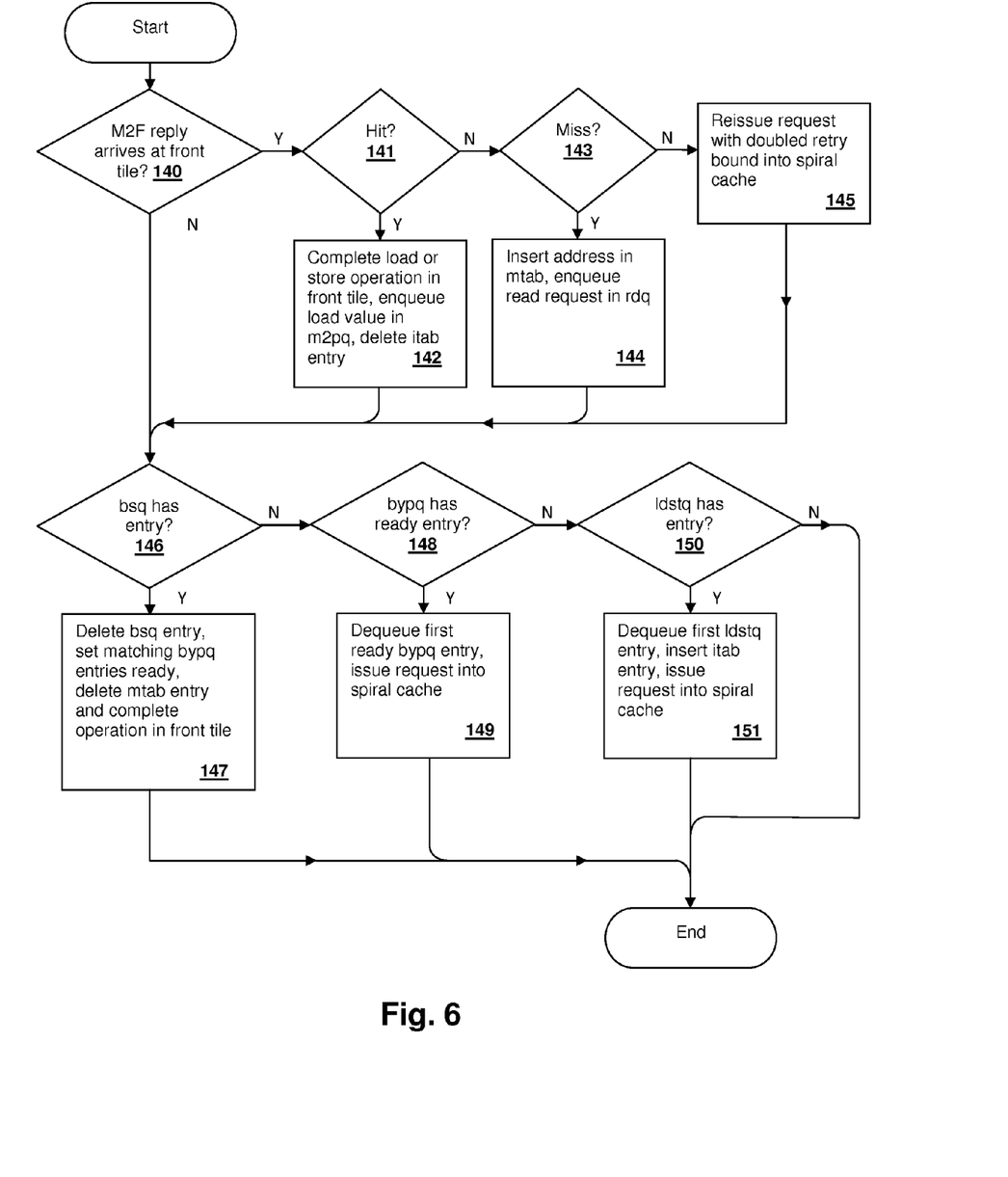
FIG. 6 is a flowchart illustrating a method of operation of control logic within memory interface 106 of FIG. 3.

Memory interface 106 also handles dequeuing and processing entries from its associated input queues. The selection of the queues determines the order in which actions are scheduled. An exemplary scheduling loop that may be implemented by memory interface 106 is illustrated in FIG. 6. The algorithm illustrated in FIG. 6 performs two activities: (1) monitoring the M2F network of spiral cache 104 for incoming requests; and (2) monitoring input queues backing store queue bsq, bypass queue bypq, and load-store queue ldstq. The algorithm of FIG. 6 is executed once per duty cycle of the systolic spiral cache. If a M2F reply arrives at front-most tile 0 (decision 140), then if the reply indicates a hit (decision 141) then the load or store operation indicated in issue table itab is completed in the front-most tile 0, the load value is enqued in memory-to-processor queue m2pq and the entry in issue table itab is deleted (step 142). If the M2F reply indicates a miss (decision 143) then the address of the reply is inserted in backing store request table mtab and a backing store read request is enqueued in read queue rdq (step 144). If the M2F reply is neither a miss or a hit, indicating that a request has not been sent to the maximum retry bound then the request is re-issued into spiral cache 104 with a doubled retry bound (step 145). Next, the input queues to memory interface 106 are monitored according to a priority scheme. Backing store queue bsq has priority over bypass queue bypq, because backing store read operations constitute the critical path due to high access latencies. Therefore, if backing store bsq has an entry (decision 146) then the entry is deleted, other entries in bypass queue bypq having the same address are set to a ready state, the corresponding entry in backing store request table mtab is deleted and the operation is completed in front-most tile 0 (step 147). Only if there was no entry in backing store bsq, bypass queue bypq is examined for ready entries (decision 148) and if bypass queue bypq contains a ready entry, the first ready entry is dequeued and a request is issued into spiral cache 104. Only if there was no entry in backing store bsq (decision 146), and no ready entry in bypass queue bypq (decision 148), is the load-store queue examined for entries, and if an entry is present (decision 150), the first entry is dequeued, a corresponding entry is inserted into issue table itab and a request is issued into spiral cache 104 (step 151). Bypass queue bypq has priority over load-store queue ldstq, because entries in bypass queue bypq are necessarily older and should be serviced before dequeuing newer requests from load-store queue ldstq.

Another important priority consideration not exposed in the scheduling loop of FIG. 6 is that if any action due to handling a queue entry coincides with the arrival of a move-to-front signal at front-most tile 0, the move-to-front signal is given priority, or the systolic dataflow of the spiral cache 104 would be violated. Therefore, the implementation of queue actions includes the following fall-back mechanism. Rather than fully dequeuing entries in steps 147, 149 and 151, the queues are "peeked" i.e., the entries are read without removal. If no collision with a move-to-front signal occurs at tile 0, the entry is dequeued. Otherwise, the action is aborted. Memory interface 106 will then retry the queue operation during the next duty cycle, because the entry is still at the head of the queue.

As in many queueing systems, the system depicted in FIG. 3 requires flow control to prevent queue overflows and the associated loss of entries. To support a storage tile network that does not have its own flow control, queue overflows in the surrounding infrastructure are prevented by the action of memory interface 106. In fact, overflows can be prevented by proper queue sizing and controlled issuing of new requests from memory interface 106 into spiral cache 104. Since backing store 112 is generally significantly slower than spiral cache 104, the critical queue of the system is push-back read queue pbrdq. To avoid requiring a push-back read queue pbrdq of unreasonably large queue size, additional overflow protection is needed. As explained above, in the worst case, the spiral cache generates one push-back for each miss. The spiral cache generates the push-back after the cache line returned by the backing store has been written into front-most tile 0. Thus, the rate at which the spiral cache can generate push-backs is equal to the rate at which backing store 112 services requests. Therefore the loop from spiral cache 104 to push-back read queue pbrdq to backing store 112 to backing store queue bsq to memory interface 106 and returning to spiral cache 104 does not pose overflow problems. A small number of entries in the push-back read queue pbrdq suffice to handle push-backs that are generated with variable delay with respect to the corresponding duty cycle when the cache line was moved to front-most tile 0.

The rate at which spiral cache 104 can generate misses and cause memory interface 106 to enqueue the associated read requests via read queue rdq to the backing store is much greater than the push-back rate, because spiral cache 104 operates at a much higher clock frequency than backing store 112. Therefore, to prevent overflow of push-back read queue pbrdq, which is the master queue of read queue rdq, the number of outstanding requests issued into spiral cache 104 must be controlled. A "one-quadrant" cache such as that illustrated in FIG. 1 having N tiles and a side length of $\sqrt{N}$ tiles contains at most $3\sqrt{N}-2$ outstanding requests. In the worst case, each of these requests misses, causing one read request per miss to be enqueued into read queue rdq, and from there into push-back read queue pbrdq. Hence, overflow of push-back ready queue pbrdq can be prevented, since memory interface 106 only issues a request into spiral cache 104 if there are at least $3\sqrt{N}-2$ empty entries in push-back read queue pbrdq. By adding a safety for a few additional empty entries, for example 8, for push-back operations, memory interface 106 will issue a new request into the strorage tile network 104 only if there are at least $3\sqrt{N}+6$ free entries in push-back read queue pbrdq. Note that the above condition depends on the number of tiles in the spiral cache 104, but is independent of the access latency of backing store 112. Thus, for a spiral cache such as that illustrated in FIG. 1, a reasonable choice for the size of push-back read queue pbrdq is 6($\sqrt{N}+1$), for example. The remaining queues can be sized in a straightforward fashion, and do not require associated flow control. Given the flow control constraint for push-back read queue pbrdq, the scheduling algorithm in FIG. 6 can be augmented such that a new request is issued from load-store queue ldstq into the spiral cache only if the conjunction of the following conditions holds: issue table itab is not full, backing store request table mtab is not full, push-back read queue pbrdq has at least $3\sqrt{N}+6$ free entries, backing store queue bsq is empty, and bypass queue bypq has no ready entries. Assuming that all queues are implemented as part of memory interface 106, each of the above conditions can be checked easily within a single clock cycle.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A storage sub-system forming a level of a hierarchical memory system, the storage sub-system comprising:
a cache memory comprising a plurality of storage locations and supporting multiple outstanding requests associated with a value stored in a unique one of the plurality of storage locations specified by an address contained within the request, wherein the cache memory moves the value specified by the address and provided in a response along with the address to a predetermined one of the plurality of storage locations that is coupled to an external interface via which the value can be accessed, whereby the value is uniquely stored in the predetermined one of the plurality of storage locations and is no longer accessible at the unique one of the plurality of storage locations and wherein the cache memory moves the value to the predetermined location in a time period determined by the proximity of the value to the predetermined location, whereby the multiple outstanding requests are satisfied out-of-order;
an issue table for tracking the multiple outstanding requests in an order of their receipt by the cache memory; and
control logic for controlling the application of the multiple outstanding requests to the value stored in the predetermined location, whereby an order of completion of the multiple outstanding requests is controlled according to the order of their receipt by the cache memory.

2. The storage sub-system of claim 1, wherein the cache memory only moves the value specified by the address to the predetermined location if the response contains a hit indicator that indicates that the value corresponding to the address was retrieved from one of the plurality of storage locations.

3. The storage sub-system of claim 1, further comprising a backing store request table for tracking read requests issued from the cache memory to a higher-order level of the memory hierarchy when a request for a particular value that is not present in one of the plurality of storage locations is received, and wherein the control logic further prevents issue of a read request when another read request having a matching address is present in the backing store request table, whereby the control logic ensures that multiple copies of a value corresponding to the matching address are not loaded into the cache memory.

4. The storage sub-system of claim 3, further comprising a read queue for queuing the read requests issued from the cache memory to the higher-order level of the memory hierarchy.

5. The storage sub-system of claim 3, further comprising a load-store queue for storing requests directed to the external interface from a lower-order level of the memory hierarchy or a processor, and wherein the control logic, in response to the cache memory moving the value to the predetermined location, removes an entry corresponding to a request for the value from the issue table.

6. The storage sub-system of claim 3, wherein the control logic, in response to receiving a given response that does not contain a hit indication, determines whether or not the given response has returned from a maximum request propagation boundary indicating that a corresponding request has missed, and if the given response has returned from the maximum request propagation boundary, inserts an entry corresponding to the address specified in the given response in the backing store request table.

7. The storage sub-system of claim 3, further comprising a bypass queue for storing an entry corresponding to the read request in response to the control logic having determined that the another read is present in the backing store request table, wherein the control logic marks the entry as not-ready when the entry is stored, and marks the entry as ready when the another read request in the backing store request table is satisfied.

8. The storage sub-system of claim 7, wherein the control logic further removes the entry from the bypass queue after the entry has been marked as ready.

9. A method of operating a storage sub-system forming a level of a hierarchical memory system and having a plurality of storage locations, the method comprising:
issuing multiple requests associated with a value stored at a unique one of the plurality of storage locations specified by an address contained within the request, wherein the multiple requests are issued before responses to the requests have been returned;
moving the value specified by the address and provided in a response along with the address to a predetermined one of the plurality of storage locations that is accessible via an external interface, whereby the value is uniquely stored in the predetermined one of the plurality of storage locations and is no longer accessible at the unique one of the plurality of storage locations and wherein the cache memory moves the value to the predetermined location in a time period determined by the proximity of the value to the predetermined location, whereby the multiple outstanding requests are satisfied out-of-order;
tracking the multiple outstanding requests in an order of their receipt by the cache memory in an issue table; and
controlling the application of the multiple outstanding requests to the value stored in the predetermined location, whereby an order of completion of the multiple outstanding requests is controlled according to the order of their issue by the issuing.

10. The method of claim 9, wherein the moving only moves the value specified by the address to the predetermined location if the response contains a hit indicator that indicates that the value corresponding to the address was retrieved from one of the plurality of storage locations.

11. The method of claim 9, further comprising:
receiving a request for a particular value that is not present in one of the plurality of storage locations;
issuing a read request to a backing store in response to receiving the request for the particular value;

responsive to the receiving, tracking read requests issued from the cache memory to a higher-order level of the memory hierarchy in a backing store request table;

preventing issue of a read request when another read request having a matching address is present in the backing store request table, whereby the preventing ensures that multiple copies of a value corresponding to the matching address are not loaded into the cache memory.

12. The method of claim 11, further comprising queuing the read requests issued from the cache memory to the higher-order level of the memory hierarchy in a read queue.

13. The method of claim 11, further comprising:
storing requests directed to the external interface from a lower-order level of the memory hierarchy or a processor in a load-store queue; and
in response to the cache memory moving the value to the predetermined location, removing an entry corresponding to a request for the value from the issue table.

14. The method of claim 11, further comprising:
in response to receiving a given response that does not contain a hit indication, determining whether or not the given response has returned from a maximum request propagation boundary indicating that a corresponding request has missed; and
responsive to determining that the given response has returned from the maximum request propagation boundary, inserting an entry corresponding to the address specified in the given response in the backing store request table.

15. The method of claim 11, further comprising:
storing an entry corresponding to the read request in a bypass queue, in response to having determined that the another read is present in the backing store request table;
marking the entry as not-ready when the entry is stored; and
marking the entry as ready when the another read request in the backing store request table is satisfied.

16. The method of claim 15, further comprising removing the entry from the bypass queue after the entry has been marked as ready.

* * * * *